United States Patent [19]
Lapp

[11] Patent Number: 5,465,755
[45] Date of Patent: Nov. 14, 1995

[54] THREE-POSITION, FOUR-WAY ROTARY VALVE WITH PISTOL GRIP ACTUATOR

[75] Inventor: Ellsworth W. Lapp, Naples, Fla.

[73] Assignee: Hydraulic Tool Engineering, Inc., Naples, Fla.

[21] Appl. No.: 259,051

[22] Filed: Jun. 13, 1994

[51] Int. Cl.$^6$ ..................................................... F15B 13/04
[52] U.S. Cl. .................................. 137/625.21; 72/453.16; 91/467; 137/625.23
[58] Field of Search .................... 72/453.16; 74/96; 91/467; 137/625.21, 625.23; 251/228; 239/526

[56] References Cited

U.S. PATENT DOCUMENTS

| | | | |
|---|---|---|---|
| 538,013 | 4/1895 | Cushman et al. | 91/467 X |
| 1,074,484 | 9/1913 | Abbott | 91/467 |
| 1,897,075 | 2/1933 | Samson | 91/467 |
| 2,777,426 | 1/1957 | Steele | 91/467 |
| 3,981,177 | 9/1976 | Di Maio et al. | 91/467 X |
| 4,342,332 | 8/1982 | Lapp | 137/625.23 |
| 4,465,167 | 4/1984 | Fujioka | 137/625.23 X |
| 4,589,272 | 5/1986 | Hutson | 72/453.16 |
| 4,595,034 | 6/1986 | Hutson | 137/625.21 |

*Primary Examiner*—Gerald A. Michalsky
*Attorney, Agent, or Firm*—Leydig, Voit & Mayer, Ltd.

[57] ABSTRACT

A valve member of a three-position, four-way valve is supported to rotate in opposite directions about a predetermined axis from a neutral position to first and second active positions. The valve member is moved between such positions by a manually operable actuator mounted on a pistol grip handle and adapted to be pivoted between a neutral position and first and second actuated positions about an axis offset from and extending perpendicular to the rotational axis of the valve member.

4 Claims, 4 Drawing Sheets

THREE-POSITION, FOUR-WAY ROTARY VALVE WITH PISTOL GRIP ACTUATOR

BACKGROUND OF THE INVENTION

This invention relates to a three-position, four-way rotary valve of the type in which a valve member is rotatably mounted in a valve housing. When the valve member is rotated in one direction from a neutral position to a first active position, passages in the valve enable pressurized fluid to flow to the first side of a utilization device (e.g., a hydraulic cylinder) while additional passages enable pressure fluid to dump to tank from the other side of the utilization device. If the valve member is rotated in the opposite direction from its neutral position to a second active position, the second side of the utilization device is pressurized and, at the same time, the first side of the utilization device is connected to tank.

Such a valve may, for example, be used in connection with a hand-manipulated tool whose operating elements are actuated by a hydraulic cylinder which is controlled by the valve.

More specifically, the invention relates to a valve in which the valve member is rotated between its positions by manually turning an actuator which is associated with the valve. Even more specifically, the invention relates to a three-position, four-way rotary valve whose valve member may be rotated between its various positions by turning the valve actuator through only a relatively small angle so as to facilitate simple and easy actuation of the valve. A three-position, four-way, "short-stroke" rotary valve of this general type is disclosed in Hutson U.S. Pat. No. 4,595,034. In that valve, the various ports and passages in the valve member and the valve housing are arranged and located so as to enable the valve member to move between its various positions while turning through a comparatively small angle such as 30 degrees.

A valve of the type disclosed in the Hutson '034 patent is shown in Hutson U.S. Pat. No. 4,589,272 as being directly connected to the hand-manipulated tool so as to facilitate use of the tool without need of connecting hoses between the valve and the tool. The actuator of the valve is an elongated handle which extends axially from the valve in a direction opposite to the tool and which is adapted to be manually rotated about the same axis as the valve member in order to move the valve member between its various positions and effect actuation of the tool.

While the direct-connect valve of the Hutson '272 patent, facilitates maneuvering and manipulation of the tool, the position of the actuating handle of the valve requires that two hands be used to position, hold and actuate the tool. One hand is required to hold the valve and the tool while the other hand is required to turn the valve actuating handle and effect actuation of the tool.

SUMMARY OF THE INVENTION

The general aim of the present invention is to provide a new and improved three-position, four-way rotary valve of the above general type and having an actuator which is located so as to greatly simplify manipulation and actuation of the valve and the connected tool and, in many instances, to enable the valve and tool to be both held and actuated by only one hand.

A more detailed object of the invention is to achieve the foregoing by providing a valve having an actuator which is rotatable about an axis extending perpendicular to the rotational axis of the valve member and which forms part of a pistol grip type handle extending generally at right angles to the tool. By manually grabbing the handle with one hand, the tool may be manipulated to a desired position and then may be operated by squeezing the actuator with the same hand.

The invention also resides in the provision of novel mechanism for converting pivotal motion of the valve actuator about one axis into rotary motion of the valve member about a perpendicular axis.

These and other objects and advantages of the invention will become more apparent from the following detailed description when taken in conjunction with the accompanying drawings.

Figure 1:
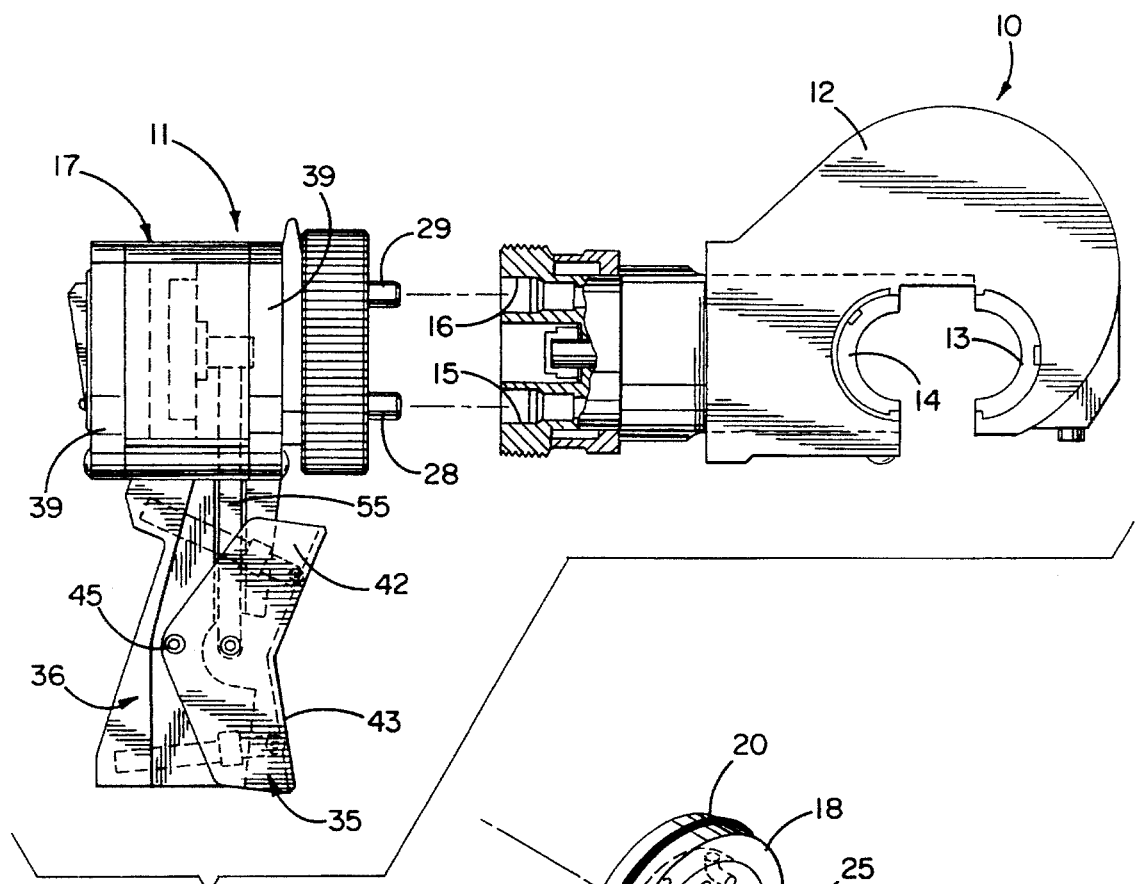
FIG. 1 is an exploded side elevational view showing a typical tool adapted to be controlled by a new and improved valve incorporating the unique features of the present invention, certain parts of the tool being broken away and shown in section.
Figure 3:
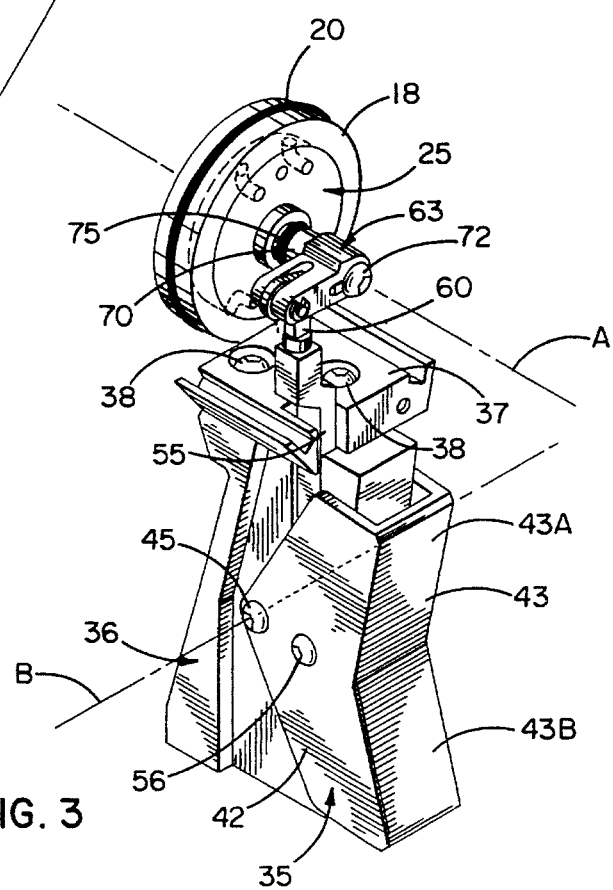
FIG. 3 is a perspective view primarily showing the valve member and the valve actuator.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention is shown in the drawings in conjunction with a hydraulically actuated tool 10 and a valve 11 for controlling actuation of the tool. While the tool may take a variety of forms, the tool which has been specifically illustrated is a crimping tool having a head 12 which supports a fixed crimping die 13. When a movable crimping die 14 is advanced toward the fixed die, the dies coact to crimp a workpiece (not shown) located between the dies.

The tool 10 may be of the same type as disclosed in Hutson U.S. Pat. No. 4,589,272, the disclosure of which is incorporated by reference, and thus the tool need not be described in detail. It will suffice to say that the tool includes a double-acting hydraulic actuator (not shown) which shifts the movable die 14 toward the fixed die 13 when oil under pressure is supplied to a socket-like passage 15 of the tool while low pressure oil in the actuator is exhausted via a similar passage 16. Conversely, the movable die is retracted away from the fixed die upon delivery of pressurized oil to the passage 16 and dumping of oil by way of the passage 15.

Figure 2:
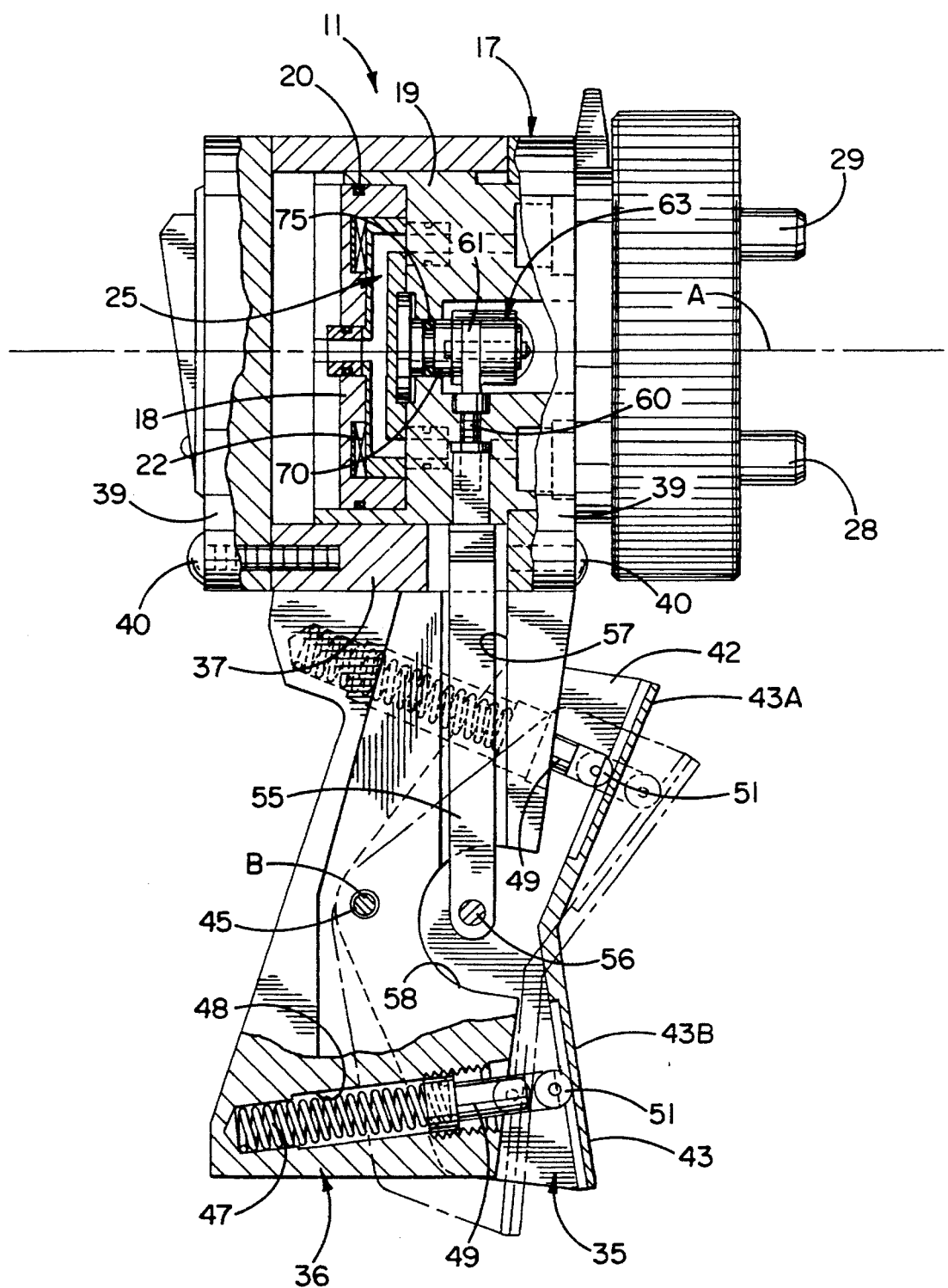
FIG. 2 is an enlarged view of the valve shown in FIG. 1 with certain parts broken away and shown in section.

In many respects, the control valve 11 for the tool 10 is similar to that disclosed in Hutson U.S. Pat. No. 4,595,034, the disclosure of which also is incorporated by reference. The valve includes a generally cylindrical housing 17 which encloses a valve body having fixed components 18 and 19 (FIG. 2), the body component 18 being generally cup-shaped and being sealed to the body component 19 by an O-ring 20. A washer 21 (FIG. 4) and a thrust bearing 22 are located within the cup 18 and support a valve member 25 for rotation about an axis A coinciding substantially with the axis of the housing. The valve member is formed with a transversely extending and generally U-shaped passage 26 (FIG. 5) whose ends define ports 27 in one face of the valve member. Additional passages and ports which need not be described also are formed in the valve member. Probe-like outlet fittings 28 and 29 (FIG. 1) project from the body component 19 of the valve 11 and are adapted to telescope with a slidable but sealed fit into the sockets 15 and 16, respectively, of the tool 10.

Pressurized oil is supplied to the valve 11 in the manner disclosed in the aforementioned Hutson '034 patent. When the valve member is located angularly in a neutral position (FIG. 5), oil supplied to the valve simply flows through the passage 26 and is returned to tank. Counterclockwise turning of the valve member through 15 degrees from the neutral position shown in FIG. 5 to a first active position shown in FIG. 6 causes pressurized oil to flow out of the outlet fitting 28 of the valve and to the socket 15 of the tool 10 in order to advance the movable die 14. As the die advances, oil in the low pressure side of the tool actuator is returned to tank via the socket 16, the fitting 29 and the valve member 25. If the valve member is rotated 15 degrees in a clockwise direction from the neutral position of FIG. 5 to a second active position shown in FIG. 7, pressurized oil flows to the tool actuator by way of the valve member, the outlet fitting 29 and the socket 16 so as to retract the movable die. At the same time, low pressure oil returns to tank via the socket 15, the fitting 28 and the valve member.

In accordance with the present invention, rotation of the valve member 25 between its positions is effected in response to manual pivoting of an actuator 35 about an axis B offset from and extending substantially perpendicular to the rotational axis A of the valve member. The actuator is associated with a handle 36 extending at right angles to the housing 17 and, by virtue of such association, the tool 10 may be manipulated and actuated in a much easier manner than has been possible heretofore.

More specifically, the handle 36 is a vertically elongated member having a mounting plate 37 (FIGS. 2 and 4) on its upper end, the mounting plate being secured to the handle by screws 38. The mounting plate is located between end flanges 39 of the housing 11 and is secured thereto by screws 40. The handle is shaped somewhat like a pistol grip and extends generally at right angles to the housing so as to be perpendicular to both of the axes A and B.

The actuator 35 comprises a pair of laterally spaced plates 42 which straddle the handle 36. A web 43 is formed integrally with and extends between the plates and has a shallow V-shaped configuration. Thus, the web includes diverging upper and lower portions 43A and 43B.

In carrying out the invention, the actuator 35 is mounted on the handle 36 to pivot about the axis B. For this purpose, a screw 45 extends somewhat loosely through the handle 36 and the plates 42 and is secured by a nut (not shown). The actuator 35 is adapted to rock clockwise and counterclockwise about the screw 45 when the handle is grabbed and when the lower and upper portions 43B and 43A, respectively, of the web 43 are squeezed. Normally, the actuator is held in a centered or neutral position. To this end, upper and lower compression springs 47 (FIG. 4) are telescoped into upper and lower holes 48 in the handle 36 and act against plungers 49 which are slidably guided by bushings 50 threaded into the holes. A roller 51 is fastened to the free end portion of each plunger by a pin 52, the upper and lower rollers riding against the upper and lower web portions 43A and 43B, respectively. The springs are symmetrically positioned on opposite sides of the axis B and normally balance one another to keep the actuator 35 in its centered or neutral position as shown in full lines in FIG. 2. When the lower web portion 43B is squeezed to rock the actuator clockwise to a first actuated position as shown in phantom lines in FIG. 2, the lower spring 47 first yields to permit such rocking and then returns the actuator to its centered position. The upper spring 47 acts in a similar manner when the upper web portion 43A is squeezed to rock the actuator counterclockwise to a second actuated position.

Means are provided for converting pivotal motion of the actuator 35 about the axis B into rotary motion of the valve member 25 about the axis A. Herein, these means comprise a vertically elongated link 55 having a lower end portion located between the plates 42 of the actuator and pivotally connected to the plates by a screw 56 secured by a nut (not shown). The screw 56 lies along an axis extending parallel to and offset from the axis B of the pivot screw 45 and thus rocking of the actuator about the latter screw effects upward and downward shifting of the link 55. A groove 57 in one side of the handle accommodates the link while a notch 58 in the handle allows the screw 56 to move in an arc around the screw 45.

Figure 4:
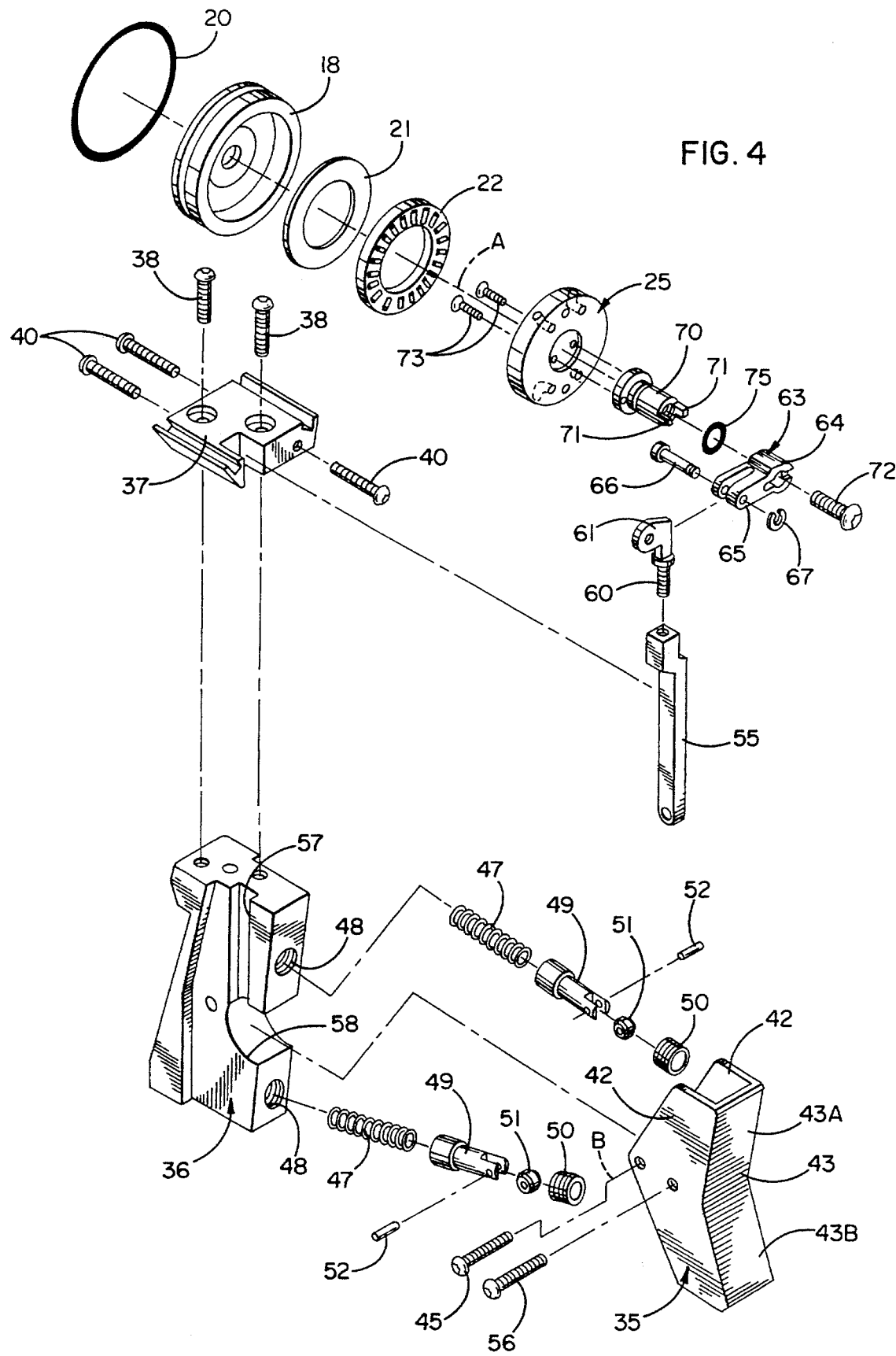
FIG. 4 is an exploded perspective view of the components shown in FIG. 3.
Figure 5:
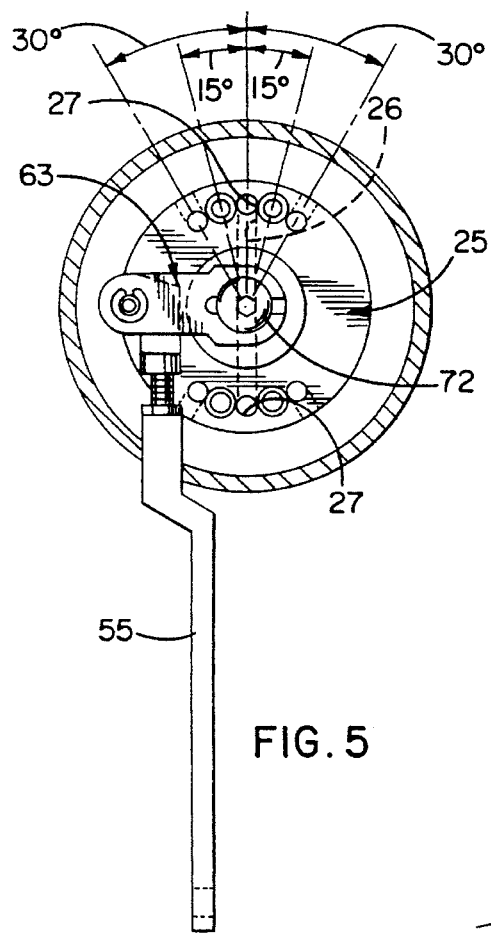
FIG. 5 is a somewhat schematic cross-sectional view taken generally radially through the valve and showing the valve member in a neutral position.

As shown most clearly in FIG. 4, a rod 60 formed with an ear 61 on its upper end is threaded into the upper end of the link 55. The ear is pivotally connected to a crank 63 having a slotted hub portion 64 coaxial with the axis A and having a clevis 65 extending radially from the hub portion. The pivotal connection is effected by a pin 66 lying along an axis which parallels the axis A, the pin being retained by a snap ring 67.

The hub 64 of the crank 63 fits over a shaft 70 (FIG. 4) having ears 71 which coact with the hub to prevent the crank from rotating relative to the shaft. A screw 72 connects the crank 63 to the shaft 70 while a pair of screws 73 connects the valve member 25 to the opposite end of the shaft. Thus, turning of the crank and the shaft effects rotation of the valve member. The shaft is journaled in the body component 19 and is sealed thereto by an O-ring 75.

Figure 6:
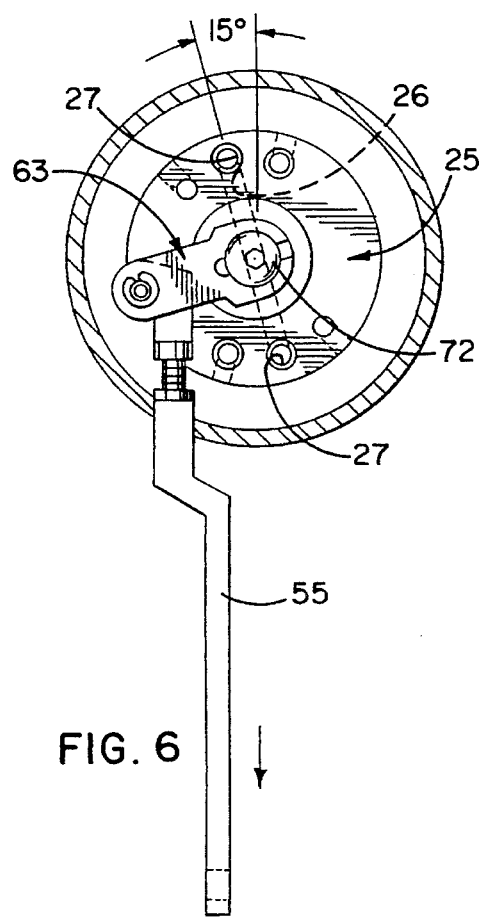
FIGS. 6 and 7 are views generally similar to FIG. 5 but show the valve member in first and second active positions, respectively.
Figure 7:
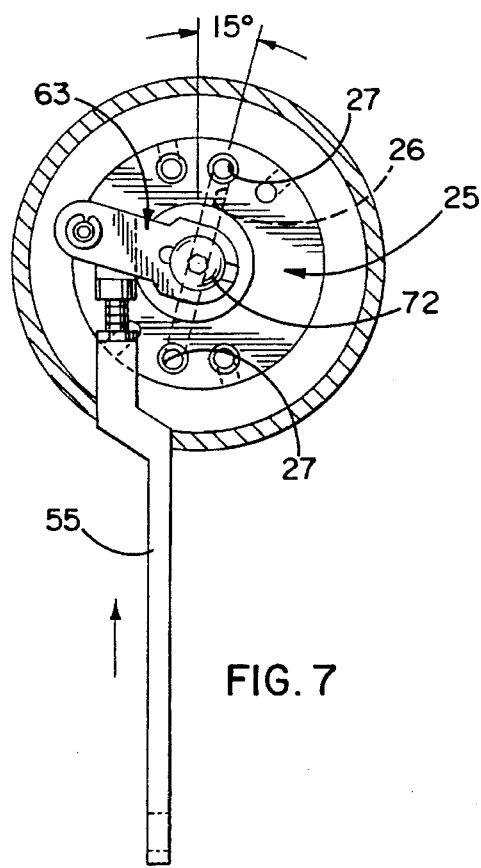

With the foregoing arrangement, the link 55, the crank 65 and the shaft 70 cause the valve member to be rotated about the axis A when the actuator 35 is pivoted about the axis B. Thus, when the actuator is pivoted clockwise, the link is shifted downwardly and turns the valve member counterclockwise from its neutral position (FIG. 5) to its first active position (FIG. 6). Counterclockwise pivoting of the actuator causes the link to shift upwardly and turn the valve member clockwise from its neutral position to its second active position (FIG. 7).

From the foregoing, it will be apparent that the present invention brings to the art a new and improved three-position, four-way rotary valve 11 in which the actuator 35 is conveniently mounted on the pistol grip handle 36 and is effective to turn the valve member 25 about an axis extending perpendicular to the pivot axis of the actuator. Because the actuator is mounted on the handle, the valve and the connected tool 10 may, in many cases, be manipulated and actuated with one hand so as to leave the other hand free to perform other tasks. Even in cases where both hands might be required to manipulate and/or hold the valve/tool assembly, the task is made easier by virtue of the actuator being mounted on the handle.

I claim:

1. A three-position, four-way rotary valve, said valve comprising a housing, a valve member supported in said housing to rotate about a first predetermined axis, said valve member normally being disposed in a neutral position and being rotatable in one direction about said axis from said neutral position to a first active position, said valve member being rotatable in the opposite direction about said axis from said neutral position to a second active position, a manually operable actuator located outside of said housing and supported to pivot relative to said housing about a second predetermined axis offset from and extending substantially perpendicular to said first axis, means biasing said actuator to a normal unactuated position while enabling said actuator to be pivoted in one direction about said second axis from said unactuated position to a first actuated position and oppositely about said second axis from said unactuated position to a second actuated position, said biasing means returning said actuator to said normal position when said actuator is manually released after being moved to either of said actuated positions, and means connecting said actuator to said valve member and operable to rotate said valve member about said first axis to said first and second active positions in response to pivoting of said actuator about said second axis to said first and second actuated positions, respectively.

2. A three-position, four-way rotary valve as defined in claim 1 in which said connecting means comprise a link having a first end portion connected to said actuator to pivot about a third axis extending substantially parallel to said second axis, said connecting means further comprising a crank fixed to said valve member and having a first portion coaxial with said first axis, said crank having a second portion extending radially from said first axis, and said link having a second end portion connected to said second portion of said crank to pivot about a fourth axis extending substantially parallel to said first axis.

3. A three-position, four-way rotary valve as defined in claim 2 further including an elongated handle connected rigidly to said housing and extending generally perpendicular to both of said first and second axes, said actuator comprising a pair of generally parallel plates straddling said handle and further comprising a generally V-shaped web spanning said plates, and means connecting said plates to said handle and supporting said actuator to pivot about said second axis.

4. A three-position, four-way rotary valve as defined in claim 1 further including an elongated handle connected rigidly to said housing and extending generally perpendicular to both of said first and second axes, said actuator comprising a pair of generally parallel plates straddling said handle and further comprising a generally V-shaped web spanning said plates, and means connecting said plates to said handle and supporting said actuator to pivot about said second axis.

* * * * *